(12) United States Patent
Shintani et al.

(10) Patent No.: US 7,876,667 B2
(45) Date of Patent: Jan. 25, 2011

(54) OPTICAL INFORMATION RECORDING MEDIUM, AND INFORMATION RECORDING METHOD AND INFORMATION REPRODUCING METHOD USING THE SAME

(75) Inventors: Toshimichi Shintani, Kodaira (JP); Yumiko Anzai, Ome (JP); Akemi Hirotsune, Saitama (JP); Hiromi Kudo, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1517 days.

(21) Appl. No.: 11/236,786

(22) Filed: Sep. 28, 2005

(65) Prior Publication Data

US 2006/0262711 A1 Nov. 23, 2006

(30) Foreign Application Priority Data

May 20, 2005 (JP) ............................. 2005-148325

(51) Int. Cl.
*G11B 7/24* (2006.01)
(52) U.S. Cl. .................................. 369/275.4; 369/275.3
(58) Field of Classification Search .............. 369/275.1, 369/275.4, 275.3
See application file for complete search history.

(56) References Cited

U.S. PATENT DOCUMENTS

| | | | | |
|---|---|---|---|---|
| 4,893,299 A * | 1/1990 | Humberstone et al. | ... | 369/275.4 |
| 5,095,428 A * | 3/1992 | Walker et al. | ................ | 711/135 |
| 5,470,628 A * | 11/1995 | Tominaga et al. | .......... | 428/64.4 |
| 5,764,619 A * | 6/1998 | Nishiuchi et al. | ........ | 369/275.1 |
| 5,882,758 A * | 3/1999 | Terada et al. | ................ | 428/64.1 |
| 2002/0054554 A1* | 5/2002 | Yamanaka | ................ | 369/53.19 |
| 2003/0123351 A1* | 7/2003 | Sawabe et al. | ............ | 369/47.24 |
| 2004/0174797 A1* | 9/2004 | Tsukagoshi | ................. | 369/103 |

(Continued)

FOREIGN PATENT DOCUMENTS

| | | |
|---|---|---|
| JP | 5-159357 | 6/1993 |
| JP | 5-282674 | 10/1993 |
| JP | 7-244870 | 9/1995 |

OTHER PUBLICATIONS

Masataka Shinoda et al., "High-Density Near-Field Readout Over 50 GB Capacity Using Solid Immersion Lens with High Refractive Index", Japanese Journal of Applied Physics, vol. 42 (2003) pp. 1101-1104, Part 1, No. 2B, Feb. 2003.

(Continued)

*Primary Examiner*—Daniell L Negrón
*Assistant Examiner*—Nicholas Lee
(74) *Attorney, Agent, or Firm*—Antonelli, Terry, Stout & Kraus, LLP.

(57) ABSTRACT

An optical disk medium in which high density recording/reproducing is possible, an information recording method and an information reproducing method using it are provided. A pit composed of a phase change material and a recording film different from it are provided on an optical disk. The phase change pit has a pattern of a single frequency. A mark having a size on the same level as the phase change pit can be formed by melting a single phase change pit while recording and controlling the optical absorbance and the temperature of the recording film at the region. A single phase change pit is molten while reproducing. Since the optical characteristics of the molten region are different from the optical characteristics of other regions, only data at the molten region can be reproduced by a super-resolution effect.

14 Claims, 9 Drawing Sheets

U.S. PATENT DOCUMENTS

2004/0190432 A1 * 9/2004 Ichihara et al. .......... 369/275.1
2005/0106508 A1    5/2005 Shintani et al.

OTHER PUBLICATIONS

Kouichi Yasuda et al., "Premastered Optical Disk by Superresolution", Japanese Journal of Applied Physics, vol. 32 (1993); pp. 5210-5213, Part 1,m No. 11B, Nov. 1993.

Masashi Kuwahara et al., "Thermal Origin of Readout Mechanism of Light-Scattering Super-Resolution Near Field Structure Disk", Japanese Journal of Applied Physics, vol. 43, No. 1A/B, 2004, pp. L8-L10.

Jia-Reuy Liu et al., "Erasable Phase Change Disks with Super Resolution Capability by Pulse-Readout", Japanese Journal of Applied Physics, vol. 37 (1998) pp. L516-L518, Part 2, No. 5A, May 1, 1998.

* cited by examiner

OPTICAL INFORMATION RECORDING MEDIUM, AND INFORMATION RECORDING METHOD AND INFORMATION REPRODUCING METHOD USING THE SAME

CLAIMS OF PRIORITY

The patent application claims priority from Japanese application JP 2005-148325 filed on May 20, 2005, the content of which is hereby incorporated by reference into this application.

CROSS-REFERENCE TO RELATED APPLICATION

This application is related to U.S. application Ser. No. 11/051143 filed on Feb. 7, 2005, the disclosure of which is hereby incorporated by reference.

FIELD OF THE INVENTION

The present invention relates to a large capacity optical disk technology and more particularly to an optical information recording medium to achieve a large capacity optical disk, and an information recording method and an information reproducing method using it.

BACKGROUND OF THE INVENTION

Recently, as a large capacity information recording technology, the research and development of high density optical recording techniques have progressed such that more information can be stored in a unit area. In an optical disk technology being commercialized now, a laser beam is focused on a disk surface to record and/or reproduce data recorded on the disk. Until now, in order to increase the density of the data, a technology has been developed in which the size of the focused laser spot is made smaller. The spot size is proportional to $\lambda/NA$, where the wavelength of the light source and the numerical aperture of the objective lens are assumed to be $\lambda$ and NA, respectively. That is, the quantity of information being stored in one disk has been increased by reducing the wavelength of the light source and by enlarging the NA of the lens. Herein, if the classification is by the wavelength of the light source, the NA of the objective lens, and the capacity of the stored data in a 12-cm diameter and is written as (wavelength, NA, capacity), then in a CD it is (780 nm, 0.5, 650 MB) and in a DVD (650 nm, 0.6, 4.7 GB). Moreover, two kinds of classification have been proposed in the technology using a blue color laser beam source, which are (405 nm, 0.85, 25 GB) and (405 nm, 0.65, 20 GB). With this storage capacity it is possible to record high definition TV image data for about two hours.

However, the above-mentioned storage capacity is not sufficient, for instance, for use in security systems and in business systems such as broadcasting stations, etc., where, for instance, a capacity of 100 GB or more is required on one disk. Moreover, for image data, etc. which is required to be stored for several tens of years to about 100 years it is desired that as much data as possible be recorded on one disk considering the storage place for such a great amount of data storage media. The required capacity is from several hundreds of gigabytes to 1 terabyte or more.

However, it is thought that a further increase in the capacity by using the above-mentioned method is difficult. First of all, regarding reduction in the wavelength of the light source, there is an expectation that the development of a laser diode being light source is extremely difficult. Moreover, even if a laser diode were developed, there is an expectation that it would be difficult to maintain excellent record/reproduction quality since the disk substrate and protective film would absorb the light because the light source is an ultraviolet light. Research to increase the NA of the objective lens is proceeding now, and, for instance, a technology in which the NA is assumed to 1.8 is reported in the Japanese Journal of Applied Physics, Vol. 42, pp. 1101-1104. However, in this system, the light for recording/reproducing is not a regular propagating light but a so-called near-field light which is a light localized at the lens, so that it is necessary to have a system in which a lens moves on a disk while bringing the lens close to the disk surface and maintaining the distance between them. Such system has a remarkable similarity to a hard disk for magnetic recording and it makes exchanging a disk difficult which is an advantage of an optical disk.

According to the background mentioned above, a technique for improving the optical resolution effectively by installing some mechanism is proposed. Hereinafter, it will be called a super-resolution technology.

A super-resolution technology which uses a phase change recording film is reported in the Japanese Journal of Applied Physics, Vol. 32, pp. 5210-5213. A phase change recording film is typically used as a recording film for a rewritable disk such as CD-RW, DVD-RAM, DVD±RW, and a Blu-ray Disc, etc. However, herein, this recording material is not used for a recording layer but used for a layer to improve the optical resolution efficiently which is the same as the reproducing layer in the above-mentioned optical magnetic disk. Herein, such layer (film) will be called a super-resolution layer (film). In this technique, a phase change recording film is deposited on a read-only (ROM) disk and a part of the phase change recording layer is molten while reproducing. If the reflectance of the disk at the molten position is sufficiently high, the signal obtained from the molten position becomes dominant in the reproducing signals. That is, the molten position of the phase change film becomes an efficient reproducing light spot. Since the area of the molten position is smaller than the light spot, the reproducing light spot is reduced, resulting in the optical resolution being improved.

A recordable super-resolution technique is also proposed. For instance, in the Japanese Journal of Applied Physics, Vol. 43, pp. L8-L10, a technique to improve the recording density is reported in which a mark is recorded by irradiating a laser pulse to a disk which has both platinum oxide and a phase change recording layer using the same method as recording a mark to a regular rewritable optical disk and super-resolution reproduction is performed. In this technique, the platinum oxide expands locally by irradiating the write laser power, and the film thickness of the phase change film is modulated corresponding to the mark. While reproducing, the super-resolution effect is obtained by melting only the part where the film thickness of the phase change layer is thin. As a result, a write-once type super-resolution disk which is available to record only once is achieved.

Moreover, the Japanese Journal of Applied Physics, Vol. 37, pp. L516-L518 reported a method to realize a rewritable disk using a technique in which a phase change film described in the Japanese Journal of Applied Physics, Vol. 37, pp. 5210-5213 is used as a super-resolution film. In this technique, two kinds of phase change films are used for the super-resolution film and the recording film, and the optical absorbance of each phase change film is controlled by the film thickness, thereby, the reproducing is performed without erasing the phase change mark written in the recording film while melting the super-resolution film during reproducing. In this technique, a material is selected so as that the crystallization speed of the phase change material used for the recording layer is made slower than that of the super-resolution film. Therefore, the recording mark is made difficult to erase during reproducing, resulting in the durability against reproduction being ensured.

[Patent document 1] JP-A, No. 244870/1995
[Patent document 2] JP-A, No. 282674/1993
[Patent document 3] JP-A, No. 159357/1993
[Non-patent document 1] Japanese Journal of Applied Physics 42, 1101-1104
[Non-patent documents 2] Japanese Journal of Applied Physics 32, 5210-5213
[Non-patent documents 3] Japanese Journal of Applied Physics 43, L8-L10
[Non-patent documents 4] Japanese Journal of Applied Physics 37, L516-L518

SUMMARY OF THE INVENTION

In a typical super-resolution optical disk, the density of recording data is increased by using a super-resolution effect while reproducing data. However, since regular thermal recording was used while recording, it was difficult to record a minute mark with excellent reproducibility.

An object of the present invention is to provide an optical disk medium which can record/reproduce with high density, an information recording method and an information reproducing method using it.

In the present invention, the above-mentioned objective is achieved by manufacturing an optical disk having the super-resolution effect while recording. A pit composed of a phase change material and a recording film different from it are installed on an optical disk. The phase change pits have a pattern of a single frequency. A mark which has almost the same size as the phase change pit can be formed by melting a single phase change pit during recording and by controlling the optical absorption and the temperature of the recording film at the region. A single phase change pit is molten while reproducing. Since the optical characteristics of the molten region are different from the optical characteristics of other regions, data only at the molten region can be reproduced according to the super-resolution effect.

An optical information recording medium of the present invention is one which comprises a pit pattern film, on which a plurality of pits molten by irradiation of recording light and irradiation of reproducing light, are regularly aligned and a recording film on which a recording mark is formed by irradiation of recording light through the molten pit.

An information recording method of the present invention is one which records information to an optical information recording medium having both a pit pattern film, on which a plurality of pits are regularly aligned, and a recording film, and comprises a process for positioning a light spot of a recording light at an information recording position of the information recording medium, a process for melting one pit of a plurality of pits of the pit pattern film irradiated by the light spot, and a process for changing the optical characteristics of the recording film through the molten pit and recording a recording mark to a region of the recording film corresponding to the molten pit.

An information reproducing method of the present invention is one which reproduces information recorded to an optical information recording medium having both a pit pattern film, on which a plurality of pits are regularly aligned, and a recording film, and comprises a process for positioning a light spot of reproducing light to a plurality of pits in order and melting one pit of a plurality of pits irradiated by the light spot, and a process for detecting the intensity of reflective light.

According to the present invention, a recordable high density optical disk, that is, a write-once type or a rewritable type super-resolution optical disk can be obtained.

DETAILED DESCRIPTION OF THE PREFERRED EMBODIMENTS

Figure 1A:
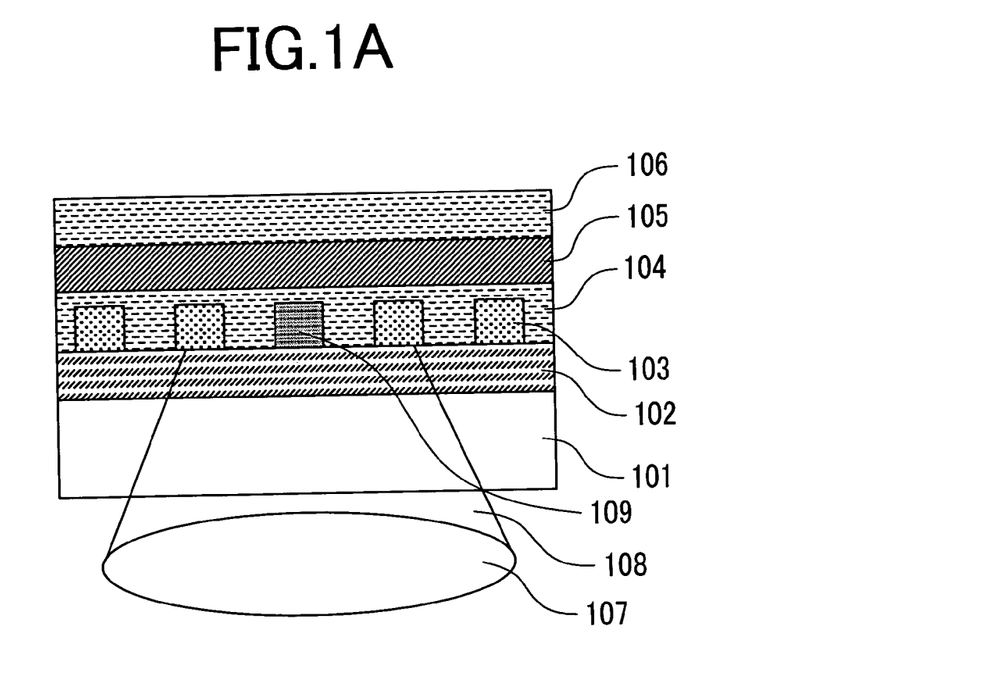
FIG. 1A is a cross-sectional schematic drawing explaining an example of an optical disk of the present invention.
Figure 1B:
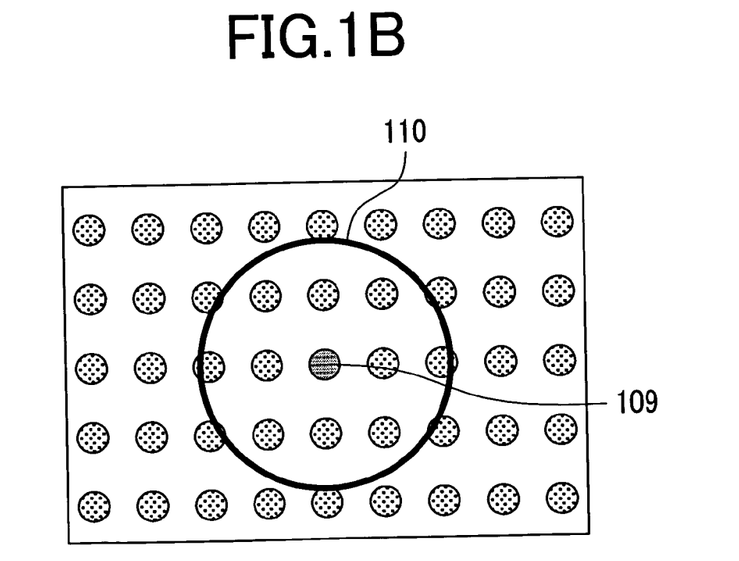
FIG. 1B is a plane schematic drawing explaining an example of an optical disk of the present invention.

Hereafter, the preferred embodiments of the present invention will be described with reference to the accompanying drawings as follows. FIG. 1 is an explanatory drawing illustrating an example of an optical disk of the present invention. FIG. 1A shows a cross-sectional schematic drawing and FIG. 1B shows a plane schematic drawing. An optical disk of this example has a stacked structure of a protective film 102, a protective film 104, a recording layer 105, and a protective film 106 on a substrate 101. A pattern pit 103 composed of a phase change material, such as GeSbTe and AgInSbTe, etc. is provided in the protective layer 104. All pattern pits 103 have almost the same size.

While recording and reproducing, a light spot 110 formed by converging the incident light 108 using the objective lens 107 irradiates the protective film 104 on which the pattern pit 103 is formed, and melts only the pattern pit 109 which is located at the position of the strongest light intensity among the pattern pits 103 irradiated by the light spot 110. Accordingly, since only the position of molten pattern pit 109 has a different optical condition in a plurality of pattern pits existing in the light spot, recording/reproducing data is possible at the molten position. This will be concretely described as follows.

Figure 2A:
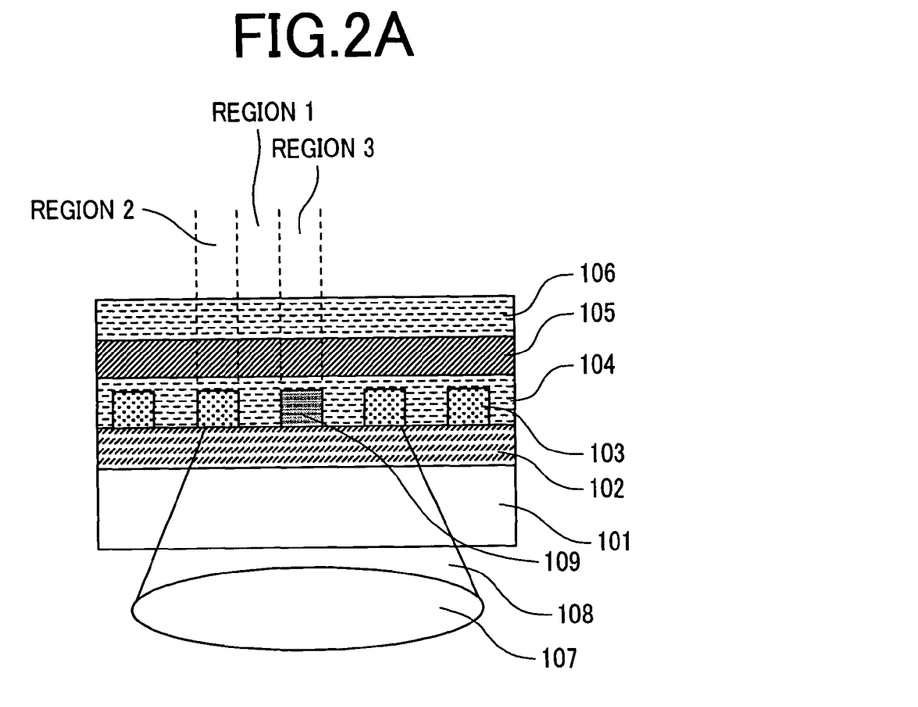
FIG. 2A is an explanatory drawing of an operation while recording of the present invention.

First of all, the principle of recording is described. Three regions as shown in FIG. 2A are defined in the optical disk shown in FIG. 1.

Region 1: Space part where a pit does not exist
Region 2: Solid pit part
Region 3: Part where a single pit melts in a part where the incident light intensity is strong (molten pit portion)

When a minute mark is recorded to the recording film 105, the mark is recorded only to the molten pit region 3. To do this, a laser pulse is given at the timing when the center of the light spot comes to the vicinity of the center of the pit. The intensity of the laser pulse is controlled to be at a level at which a single pattern pit melts. At this time, if the optical absorbance of the recording film 105 at the region 3 is greater compared with the other two regions, the part of the recording film corresponding to the region 3 locally absorbs, and a minute mark can be recorded only at that part. That is, when the optical absorbance of the recording layer at the region n is written as $A_n$, one only has to assume that $A_3 > A_1$ and $A_3 > A_2$. This becomes possible by making an optical disk which takes into consideration the material constituting the optical disk and the refractive index of both the solid state and molten state of pit. Physical changes, crystal structure changes, and chemical changes are acceptable for the recording mechanism in this case. Furthermore, chemical changes induced by absorption of photons may be acceptable.

In the above-mentioned recording method, the position of the light spot and the position of the pattern pit are necessary to be matched when the recording pulse is given. This can be achieved by either of the following methods. The first method is one in which the pattern pit is read while recording and the signal and the phase of the clock signal of the drive are matched by using a PLL (phase-locked loop) circuit. Therefore, all pattern pits are molten while recording. The second method is one in which a pattern pit for a PLL is prepared regularly on the track of the optical disk. In this case, it is preferable that the pattern pit for a PLL be greater than the optical resolution of the light spot and has a large size to the extent to which a signal can be obtained by a regular reproducing method. Moreover, since there is shift created in time in the phase matched by the PLL, it is necessary that the pattern pit for the PLL appear regularly to some extent.

Figure 2B:
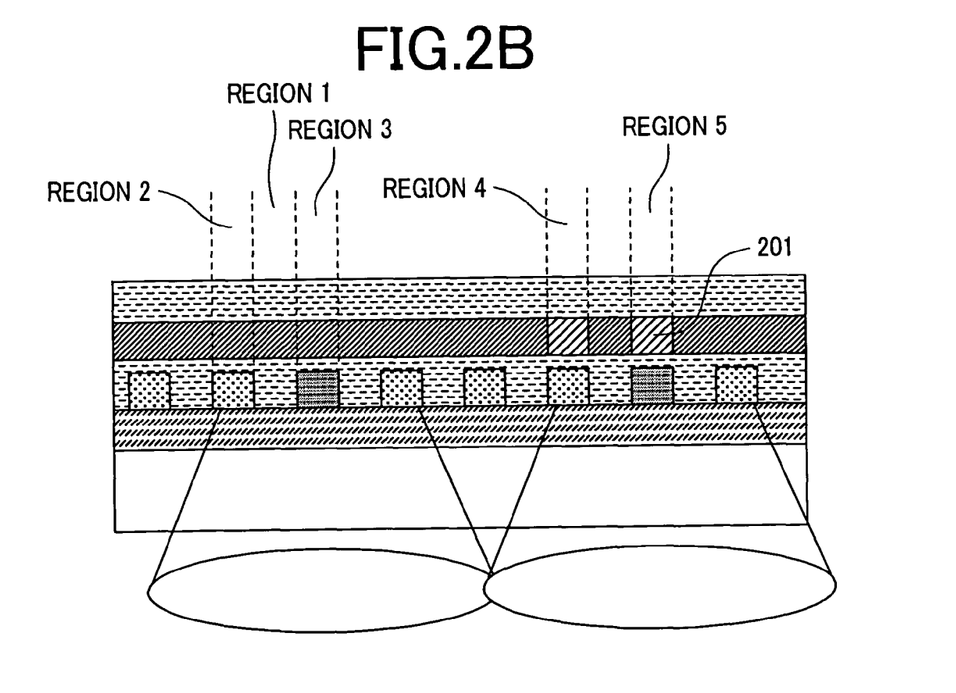
FIG. 2B is an explanatory drawing of an operation while reproducing of the present invention.

Next, the principle of reproducing is described. While reproducing, a smaller mark than the light spot is reproduced by melting the single pit and by using the difference of the optical conditions between the molten pit position and the other parts. In the case of reproduction, five regions are considered as shown in FIG. 2B. The regions 1 to 3 are the same as in FIG. 2A.

Region 4: Part where a recording mark 201 exists in the recording film and the pattern pit is solid.

Region 5: Part where a recording mark 201 exists in the recording film and the pattern pit is molten.

Herein, the amplitude of the reproducing signal is determined by the difference in the optical characteristics between the region 3 and the region 5. That is, in a method for detecting the reflective light which is the same as a conventional optical disk, this is determined by the difference of the reflectance $R_3$ of the region 3 and the reflectance $R_5$ of the region 5, $|R_3-R_5|$. However, for instance, when the difference in reflectance between region 2 and the region 4, $|R_2-R_4|$, is large, it becomes a factor of reproducing signal noise, so that it is necessary to make $|R_2-R_4|$ smaller.

That is, in order to ensure both read/write characteristics, one only has to design the optical disk structure using the following guidelines; (1) $A_3>A_1$, (2) $A_3>A_2$, (3) $|R_3-R_5|$ is made as large as possible, and (4) $|R_2R_4|$ is made as small as possible.

Herein, desirable values of $|R_3-R_5|$ and $|R_2-R_4|$ are estimated. The primary factor which determines the quality of the reproducing signal is SNR, and, herein, the signal S and the noise N are assumed to be determined by $|R_3-R_5|$ and $|R_2-R_4|$, respectively. The light source of the drive is assumed to be 405 nm, the NA of the objective lens 0.85, the smallest mark length 50 nm, the track pitch 240 nm, and the mark width 120 nm. The signal S is obtained by melting pits. Here, the medium noise is assumed to be light intensity obtained from the pits which are not molten. When the area that the pit occupies on the optical disk is assumed to be ¼ and the light intensity is 1, the light intensity obtained from the pits which are not molten, which is the noise N, can be expressed as $\alpha|R_2-R_4|/4$. Herein, $\alpha$ is a constant. On the other hand, when the center of the light spot is located on the center of the smallest mark, the light intensity obtained from the molten pit is $0.032\alpha|R_3-R_5|$ because about 3.2% of the light intensity irradiates to the mark. Therefore, SNR is expressed as $0.128|R_3-R_5|/|R_2-R_4|$.

The required SNR strongly depends on the signal reproducing system. However, here, if it is assumed to be 17 dB, it is understood that a sufficient SNR can be ensured when $|R_3-R_5|/|R_2-R_4| \geqq 55.2$. Even if the SNR is lower than this, data can be reproduced at a low error rate with an acceptable level to put it to practical use by embedding a signal processing system into the reproducing signal system.

In the above-mentioned method, the pattern pit is molten while both reading/writing. In the case when the pattern pit is composed of GeSbTe and AgInSbTe, etc. which are used for the recording film of a phase change optical disk, the melting point is typically from 550 to 650° C. Heat generated in the pattern pit 109 diffuses to the recording film 105 through the inside of the protective film 104. When the recording film 105 reacts because of this heat, it causes a mark to be recorded by the reproducing light and the shape of a mark which is already recorded is brought into a state of disarray. In order to avoid this phenomenon, the temperature to form the mark of the recording film should be greater than a certain level. The extent to which the heat generated at the pattern pit affects the temperature of the recording layer depends on the thickness of the protective film 105 and the thermal conductivity, etc. However, now, the temperature of the recording film is assumed to be almost the same as the temperature of the pattern pit. In the case when a mark is recorded on a typical phase change optical disk mark, the maximum temperature in the recording film reaches from 800 to 900° C. In the present invention, when reproduction is performed while melting the pattern pit, it is thought that the temperature in the recording film reaches about 900° C. at the part with the highest temperature. Therefore, when the threshold reactive temperature of the recording film is low, it causes that a mark is recorded by the reproducing light and the shape of a mark which is already recorded is brought into a state of disarray. Accordingly, the threshold reactive temperature of the recording film is preferably 1000° C. or more. Moreover, when the threshold reactive temperature is too high, there is a possibility that the adjacent protective film peels off or deforms while recording a mark. In order to avoid this phenomenon, the threshold reactive temperature of the recording film is preferably 1500° C. or less. That is, it is necessary to select a recording mechanism and a recording film material in which the threshold reactive temperatures are 1000° C. or more and 1500° C. or less.

As a recording mechanism to meet the above-mentioned conditions, for instance, a method in which two materials are melted and mixed is provided. That is, films composed of material A and material B are adjacently deposited. The temperature of the film increases by irradiating light into the film and both materials A and B are molten, resulting in A and B being mixed at the molten area. If the difference of reflectance between the cases of A and B existing individually and being mixed is used, it becomes possible to reproduce the recording mark. In this case, since the reaction is irreversible, this optical disk becomes a write-once optical disk.

In order to use the above-mentioned mechanism and to control the threshold reactive temperature to be 1000° C. or more and 1500° C. or less, each melting point of material A and material B has to be 1000° C. or more and 1500° C. or less. There are Si, Ti, V, Cr, Mn, Fe, Co, Ni, Cu, Y, Zr, Nb, Pd, Gd, Hf, Pt, and Au as such a material. If two films are fabricated using at least one element selected from the group, the above-mentioned requirement can be satisfied.

By applying a method described in the Japanese Journal of Applied Physics Vol. 37, L516-L518 to the present invention, it is possible to produce a rewritable optical disk using the present invention. Herein, if both film thicknesses of the pattern pit and the recording film and the distance between them are kept sufficiently, it is possible to reproduce a mark in the recording film without erasing while reproducing and to record a minute phase change mark by using the pattern pit.

Moreover, the recording film may be a transparent material. The heat generated at the pattern pit conducts to the transparent material, thereby, a mark can be recorded by changing the refractive index of the transparent material or by deformation taking place. A transparent material used for the recording film is, for instance, an oxide and nitride, which are materials where oxygen and nitride are released at a high temperature and become colored. As an example, for instance, an oxide of Ti, V, Cr, Mn, Fe, Co, Ni, Cu, Zn, W, Pt, or Au can be used. Moreover, a UV curable resin can also be used. The glass transition point of a UV curable resin is typically from 150° C. to 250° C., and it deforms at a temperature higher than that temperature. A UV curable resin can be locally deformed by the heat generated locally at the pattern pit. If the recording film is formed of a transparent material, the permeability of the optical disk is improved and a multi-layer optical disk can be fabricated as described in the Japanese Journal of Applied Physics Vol. 43, L8-L10.

Next, a manufacturing method of a pattern pit is described. A pattern pit can be fabricated by using a phase change etching technique in which a physical pattern is processed by using the solubilities of the crystalline part and the amorphous part of a phase change recording layer in an alkaline solution. A phase change mark corresponding to the pattern pit is formed by some methods, and then etched by using an alkaline solution, resulting in a pattern pit being fabricated.

FIG. 3 is a process explanatory drawing illustrating an optical disk of the present invention. The films shown in FIG. 3A are stacked prior to recording an amorphous mark to be a pattern pit later. That is, a lower protective film 302, a phase change film (amorphous) 303, an upper protective film 304, a reflective film 305, and an upper substrate 306 are stacked on a lower substrate 301. Since the phase change recording film 303 is in an amorphous state in the case when it is deposited by a sputtering method, it is crystallized to be a crystalline phase change film 307 as shown FIG. 3B. Crystallization may be carried out by baking the sample of FIG. 3A, and it also may be carried out by using the heat generated by irradiating the laser beam and absorbing the light at that time into the recording film. Next, as shown in FIG. 3C, an amorphous mark 308 is recorded by irradiating a laser beam to the sample, and then, the upper protective film 304 is peeled off as shown in FIG. 3D. In the case when the upper protective film 304 is, for instance, $SiO_2$ etc., it is comparatively easy to be peeled off because the adhesiveness with the phase change film is weak. For instance, even if a part of the $SiO_2$ remains on the phase change film, it will be easily peeled off in the next etching process.

Figure 3A:
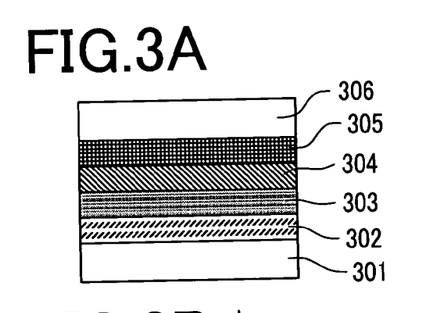
FIG. 3A is a process explanatory drawing for manufacturing an optical disk of the present invention.
Figure 3B:
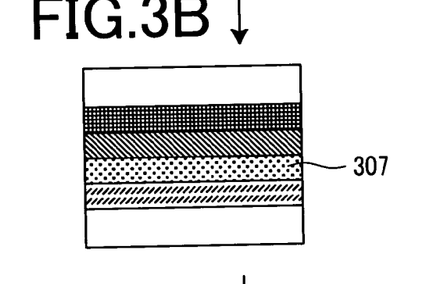
FIG. 3B is a process explanatory drawing for manufacturing an optical disk of the present invention.
Figure 3C:
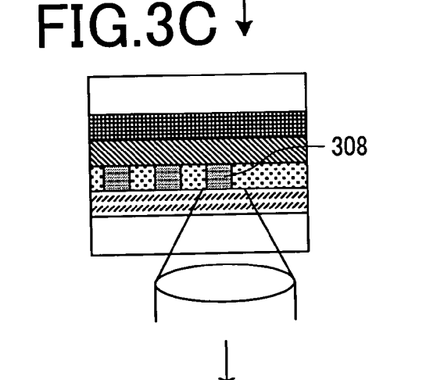
FIG. 3C is a process explanatory drawing for manufacturing an optical disk of the present invention.
Figure 3D:
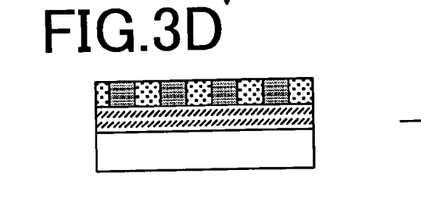
FIG. 3D is a process explanatory drawing for manufacturing an optical disk of the present invention.
Figure 3E:
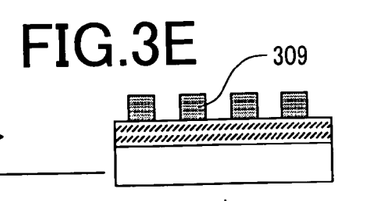
FIG. 3E is a process explanatory drawing for manufacturing an optical disk of the present invention.
Figure 3F:
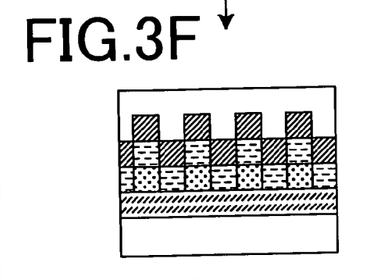
FIG. 3F is a process explanatory drawing for manufacturing an optical disk of the present invention.
Figure 3G:
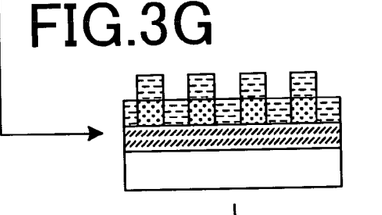
FIG. 3G is a process explanatory drawing for manufacturing an optical disk of the present invention.

Next, as shown in FIG. 3E, a concavo-convex pit (pattern pit 309) is fabricated by dipping the sample in an alkali solution to dissolve the crystalline part. Then a protective film and a recording film are deposited and adhered to a substrate by a UV resin to form an optical disk shown in FIG. 3F, resulting in an optical disk shown in FIG. 1A. Although it works as an optical disk even in the state of FIG. 3F, the concavo-convex structure remains up to the reflective film, which is a difference from an optical disk shown in FIG. 1A.

Figure 3H:
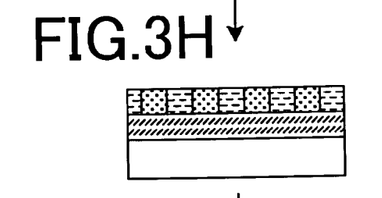
FIG. 3H is a process explanatory drawing for manufacturing an optical disk of the present invention.
Figure 3I:
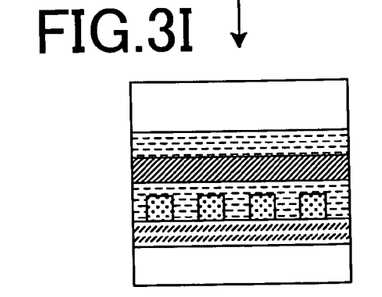
FIG. 3I is a process explanatory drawing for manufacturing an optical disk of the present invention.

In order to make it into a structure shown in FIG. 1A, only a protective film is first deposited after the process of FIG. 3E. At this time, the pit of the phase change film is being crystallized. The surface of the phase change film is dissolved by dipping this sample into an alkaline solution and only the protective film on the pit part of the phase change film is lifted off, resulting in it becoming flat as shown in FIG. 3H. Or, in the case when the protective layer is composed of $SiO_2$, it is peeled off only by dipping into a liquid before the pit part dissolves. In this case, the liquid is not necessary to be an alkaline solution, and, for instance, water may be used. A reflective film is deposited on the sample of FIG. 3H and a substrate is adhered to it, resulting in an optical disk being obtained which has the same structure as FIG. 1A.

In the method shown in FIG. 3, a mark has to be recorded one by one to make one optical disk, and it takes time. On the other hand, in the fabrication of a typical ROM disk, a concavo-convex structure is formed by recording a mark one by one when a master is fabricated. A stamper is formed from the master and molten polycarbonate is poured into the stamper to make copies of the physical pattern. This is called an injection technique. In this technique, it takes time to fabricate a master, but, after fabricating the stamper, production time per optical disk becomes shortened drastically.

There is a method shown in FIG. 4 as a method to solve the problem of the above-mentioned production time. First of all, a stamper having a concavo-convex structure corresponding to the pattern pit is fabricated using a method shown in FIG. 3. It becomes possible to make the sample of FIG. 3E to be a stamper. On the other hand, as shown in FIG. 4A, a protective film 402 and a phase change film 403 in an amorphous state are deposited on a substrate 401. Herein, as shown in FIG. 4B, the stamper 404 fabricated as described above is pressed. In this state, only the convex part of the concavo-convex structure of the stamper contacts the phase change film 403. Then, a voltage pulse is applied to the gap between the stamper 404 and the phase change film. Accordingly, current flows in the phase change film to generate Joule's heat. However, the greatest current density is obtained at the contact surface between the stamper 404 and the phase change film 403, so that greatest heat is generated at that part. Accordingly, as shown in FIG. 4C, the crystalline mark 405 is formed and the physical pattern of the stamper 404 is transferred in the phase change film 403 as a crystalline and amorphous pattern. The pattern pit as shown in FIG. 4D is formed by etching this sample. The state of FIG. 4D is the same as the state of FIG. 3E, and the processes after this are the same as those from FIG. 3E on.

Phase change by an electric current occurs in a time from nanoseconds to microseconds, so that the processes shown in FIG. 4 do not take time. Although there is a case in which etching takes from several tens of minutes to about one hour, since the process is only dipping into an alkaline solution, it is possible that several hundred disks and thousands of disks can be etched at the same time. Therefore, the process shown in FIG. 4 makes it possible to achieve a production time which compares favorably with current injection techniques.

Next, shape of the pattern pit is described. Now, the length of the pit in the tracking direction is written as Lm and the length in the direction perpendicular to the track, that is, the width, is written as Wm. In the case of a typical ROM disk, $Lm \geq Wm$. Now, if the size relationship of Lm and Wm is seen from the longer mark in order, after they become Lm=Wm, Wm becomes smaller while keeping the relationship of Lm=Wm. This is due to the recording mark of a ROM disk being recorded by a so-called photon mode which is determined the quantity of photons to be absorbed in the resist to be exposed. In this case, the shape becomes circular when it is a short mark, so that it is called a circular mark herein. On the other hand, there is an optical disk in a part of a phase change optical disk, in which the short mark has a relationship of $Lm \leq Wm$. The Japanese Journal of Applied Physics, Vol. 41, pp. 631-635 reported that this is due to a crystallization mechanism of the phase change recording film. Such a mark is called a chevron mark. Advantages of the chevron mark are that the mark area is large caused by a wide width even if it is a short mark and that a large reproducing signal can be obtained. Therefore, if the pattern pit is formed by a chevron mark, a signal of sufficient amplitude can be obtained even if it is a very small mark.

Hereinafter, the present invention will be described more in detail.

FIRST EMBODIMENT

Figure 5A:
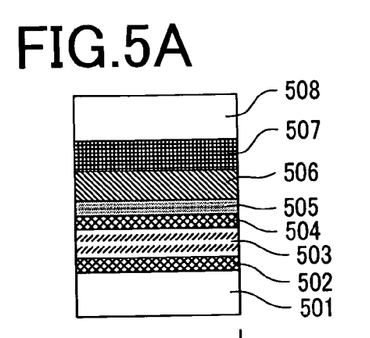
FIG. 5A is an explanatory drawing for manufacturing an optical disk of the first embodiment of the present invention.
Figure 5B:
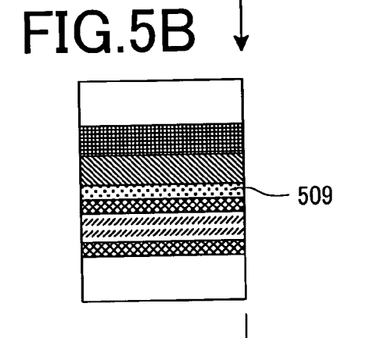
FIG. 5B is an explanatory drawing for manufacturing an optical disk of the first embodiment of the present invention.
Figure 5C:
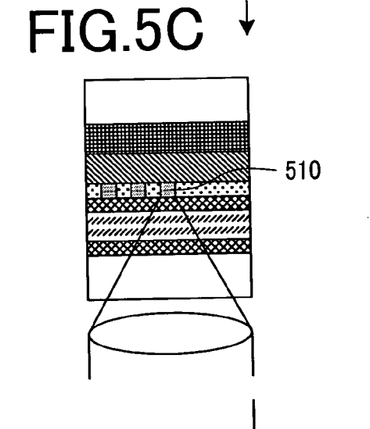
FIG. 5C is an explanatory drawing for manufacturing an optical disk of the first embodiment of the present invention.

A case describes that the present invention is achieved by using Ag and Fe as a recording film. An optical disk having a structure shown in FIG. 5A was fabricated. All thin films were deposited by a sputtering technique. A 200 nm thick Ag film 507, a 5 nm thick $SiO_2$ film 506, a 5 nm thick amorphous state $Ge_2Sb_2Te_5$ film 505, a 5 nm thick $Cr_2O_3$ film 504, a 110 nm thick $SiO_2$ film 503, a 5 nm thick $Cr_2O_3$ film 502, and a 0.1 nm thick polycarbonate sheet were stacked on a glass substrate 508. Next, as shown in FIG. 5B, the phase change film 505 which is in a state close to an amorphous one is crystallized by irradiating a laser beam to make a crystallized phase change film 509. Next, a laser beam is irradiated to this optical disk and the recording film is locally molten to record an amorphous mark 510 as shown in FIG. 5C.

Figure 6:
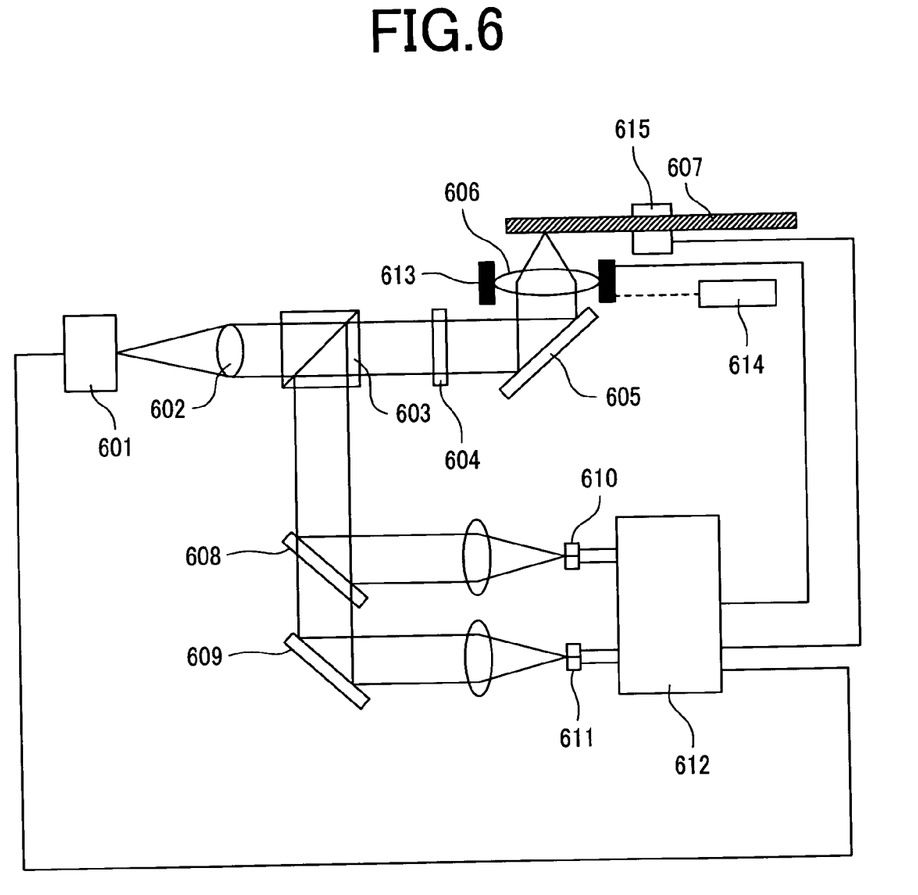
FIG. 6 is a drawing illustrating an example of a structure of a recording/reproducing device.

FIG. 6 is an example of a configuration illustrating the recording device. This device is also equipped with the ability to reproduce the mark, and the configuration is the same as a typical optical disk drive.

The spindle 615 imparts a rotary drive to the optical disk 607. The light which is a linearly polarized light emitted from the laser diode 601 is made a collimated light by the lens 602. If the polarized beam splitter 603 is provided to make the above-mentioned linearly polarized light transmit, almost the entire quantity of light of the linearly polarized light is transmitted. The light exchanged by the λ/4 plate 604 from a linearly polarized light to a circular polarized light makes a focused spot on the optical disk 607 through the mirror 605 and objective lens 606. The reflective light from the optical disk passes the objective lens 606 and the mirror 605, and is exchanged from the circular polarized light to the linearly polarized light again by the λ/4 plate 604. The plane of polarization of this linearly polarized light is perpendicular to the plane of polarization of the linearly polarized light emitted from the laser diode 601. Therefore, in the polarized beam splitter 603, the path of almost the entire quantity of light changes 90° and is injected into the half mirror 608 and the mirror 609. One of the lights is injected into the detector 610 for the auto-focusing servo signal, and another is injected into the detector 611 for the reproducing signal and the tracking signal. Signals detected by these detectors are input into the signal processing and control system 612. The function of the signal processing and control system 612 is to control the position of the objective lens 606 by controlling the actuator 613, to form a wave shape of the laser beam which is necessary for recording, to control the reproducing light power, and to calculate the reproducing signal.

This device has a laser interferometer 614 to measure the positional relationship between the optical disk and the head. This signal is transferred to the signal processing and control system 612, and a mark pattern having an almost constant track pitch can be recorded in the optical disk even in the case when there is no track and mark for tracking servo in the optical disk.

Herein, the light source wavelength of the device shown in FIG. 6 was assumed to be 405 nm, and the numerical aperture (NA) of the objective lens 606 was assumed to be 0.85.

Figure 7:
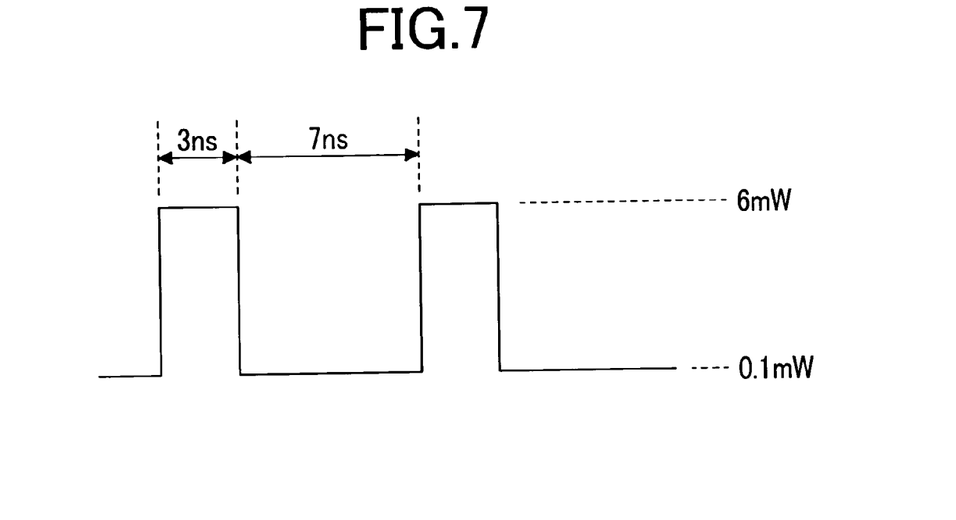
FIG. 7 is a drawing showing a recording waveform used in the first embodiment.
Figure 8:
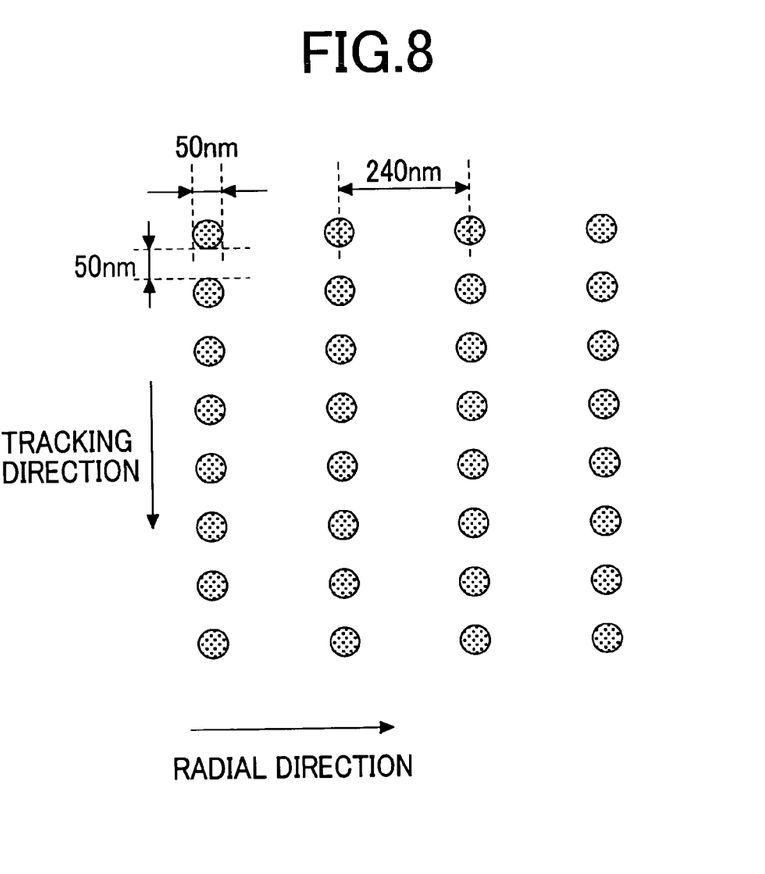
FIG. 8 is a schematic drawing illustrating a pattern pit fabricated in the first embodiment.

An amorphous mark 510 which became an origin of the pattern pit was recorded as shown in FIG. 5C using the device of FIG. 6. Herein, the optical disk was rotated to achieve a relative speed of 5 m/s to the spot. Moreover, the track pitch was controlled to be 240 nm. The emission waveform of the laser for recording is shown in FIG. 7. As shown in FIG. 8, a circular shaped amorphous pattern with both a pit length and a space length of 50 nm is formed using this condition. However, 1000 amorphous marks are made in one group, and fifty patterns with both a pit length and a space length of 150 nm are inserted in the gap between groups. This pattern is used for controlling the timing of the pattern pit and laser pulse while recording. It is called a VFO pattern here. Details will be described later.

Figure 5D:
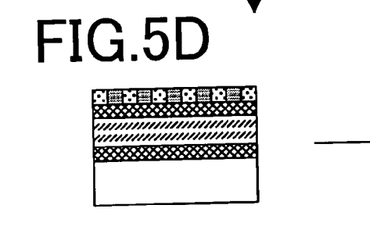
FIG. 5D is an explanatory drawing for manufacturing an optical disk of the first embodiment of the present invention.
Figure 5E:
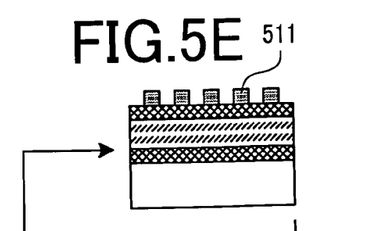
FIG. 5E is an explanatory drawing for manufacturing an optical disk of the first embodiment of the present invention.
Figure 5F:
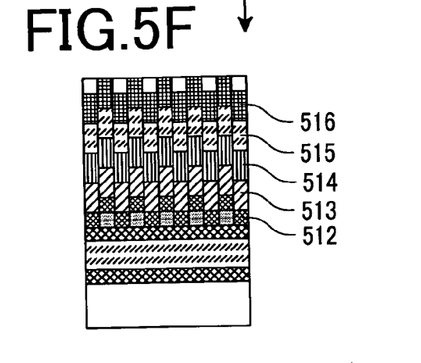
FIG. 5F is an explanatory drawing for manufacturing an optical disk of the first embodiment of the present invention.

When the sheet 501 of the optical disk of FIG. 5C is peeled off, the configuration becomes one shown in FIG. 5D. This reason is that the adhesiveness of the phase change film 505 and the $SiO_2$ 506 is weak, and the film peels off at the interface of these films. The crystalline part of the phase change film 505 is dissolved by dipping this sample into NaOH of pH13 for one hour, and the pattern pit 511 is formed as shown in FIG. 5E. AS shown in FIG. 5F, a 5 nm thick $Cr_2O_3$ film 512, a 30 nm thick Ag film 513, a 30 nm thick Fe film 514, a 20 nm thick $SiO_2$ film 515, and a 100 nm thick Ag film 516 are deposited on this sample by sputtering.

When data is recorded in this optical disk, the Ag film 513 and the Fe film 514 are molten and the state of the Ag—Fe alloy is assumed to be a mark. Since the reflectance of the Ag—Fe alloy is different from the unit thin films of Ag and Fe, the recording mark can be read out by the quantity of reflective light like a typical optical disk drive.

Table 1 shows the reflectance of the optical disk of FIG. 5F. Since the reflectance of an optical disk of the present invention depends on the state of the pattern pit and the presence of the mark in the recording film, each case is described.

TABLE 1

|  | Region 1 | Region 2 | Region 3 | Region 4 | Region 5 |
| --- | --- | --- | --- | --- | --- |
| State of recording mark | Not exist | Not exist | Not exist | Exist | Exist |
| State of pattern pit | Not exist | Crystalline | Molten | Crystalline | Molten |
| Reflectivity | 28.6% | 22.7% | 7.4% | 22.7% | 14.5% |
| Absorbance of recording film | 33.5% | 55.4% | 76.6% | 62.8% | 73.9% |

As mentioned above, in order to ensure the signal-to-noise ratio (SN ratio) of the present invention, the following four guidelines are necessary; (1) $A_3 > A_1$, (2) $A_3 > A_2$, (3) $|R_3 - R_5|$ is made as great as possible, and (4) $|R_2 - R_4|$ is made as small as possible. Herein, $R_n$ is the reflectance at the region n and $A_n$ is the absorbance of the recording film at the region n.

In Table 1, the conditions (1) and (2) are satisfied, and $A_3 - A_1$ and $A_3 - A_2$ are large enough, so that only the region where the pattern pit is molten can be recorded ensuring enough margin.

Moreover, in Table 1, $|R_3 - R_5| = 7.1\%$. This value is greater than 5% which is, for instance, a typical value of the reflectance difference between the mark and the space of the read-only double layer optical disk being commercialized now, resulting in sufficient signal amplitude being obtained. Moreover, since $|R_2 - R_4| \approx 0$, the difference of the presence of the mark in the recording layer is not detected as long as the pattern pit does not melt. Therefore, since disturbance from the other marks is not included, a high SN ratio can be obtained.

A mark was recorded by irradiating a laser pulse to this optical disk using the device shown in FIG. 6, and the mark was read out using the device of FIG. 6.

While recording, a recording waveform similar to FIG. 7 was used at a line speed of 5 m/h. However, the recording power is controlled to be 5 mW. The melting points of Ag, Fe and the alloy are about 1000° C., 1500° C., and 1000° C., respectively. According to this recording condition, the Ag and Fe are mixed with each other by reaching the temperature of the region in the recording film in which the pattern pit is molten to about 1500° C., resulting in a mark composed of an alloy being formed.

The 1-7 modulation which was the same as a Blu-ray Disc was used for the modulation code. In this modulation, if the window width is written as Tw, the shortest mark length and the longest mark length are 2 Tw and 8Tw, respectively. Herein, one pattern pit is assumed to be 1 Tw and a mark with a length of nTw means that marks are recorded in the recording film in a region of n continuous pattern pits. Therefore, the data capacity of this optical disk becomes about 50 GB.

The above-mentioned VFO pattern was used to adjust the position of the laser pulse and pattern pit while recording. Since the position of a pattern pit can be known from the clock signal of the drive by adjusting the signal reading the VFO pattern and the phase of the inside clock of the drive using the phase lock loop circuit in the drive, timing of laser pulse can be controlled by using the clock signal.

Figure 9:
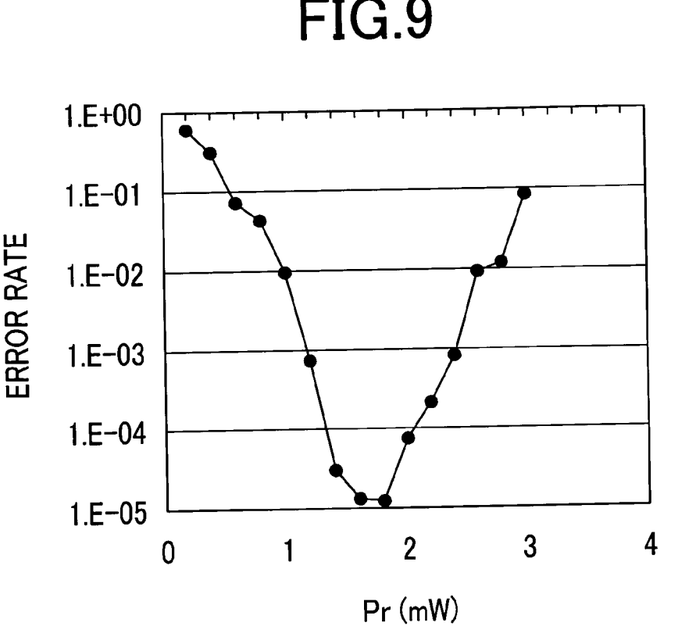
FIG. 9 shows a relationship between the reproducing light power and the data error rate when the optical disk of the first embodiment is reproduced by using DC light.

FIG. 9 is a relationship between the power Pr of the reproducing light and data error rate when reproduction is performed by irradiating DC power at a line speed of 5 m/s. Herein, Pr=1.8 mW and an error rate of $1.2 \times 10^{-5}$ was obtained. This value is sufficiently smaller than the error rate of $1 \times 10^{-4}$ which is necessary for practical use. According to this reproducing condition, a data transfer rate of about 110 MHz became possible.

Figure 10:
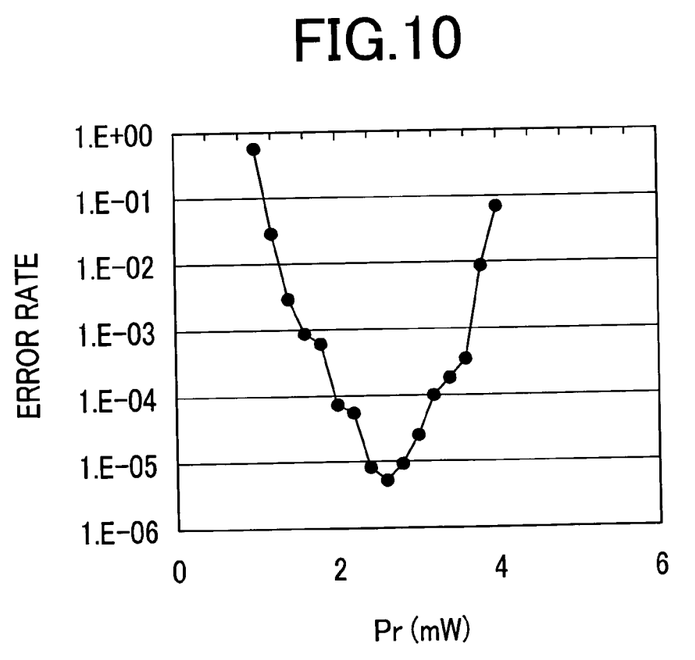
FIG. 10 shows a relationship between the reproducing light power and the data error rate when the optical disk of the first embodiment is reproduced by using pulse light.

Next, pulse light is injected while reproducing. Herein, a pulse of 1 ns in length is irradiated once every 10 ns. The timing of pulses was controlled by adjusting the phase using the VFO pattern the same as the above-mentioned case for recording. The line speed of the optical disk is controlled to be 5 m/s. Accordingly, a pulse of 1 ns is irradiated onto the pattern pit. FIG. 10 is a relationship between the pulse power Pr of the signal reproduced by this condition and the data error rate. It is assumed that the reason why the error rate becomes smaller than the reproduction by DC power was that the thermal interference between the pattern pits was suppressed by pulse irradiation. That is, a single pit is principally molten while recording/reproducing, but a plurality of pits are sometimes molten at the same time due to the fluctuation of heat conduction caused by defects of the optical disk and to the deviation of the light spot from the focused position and the track center. In pulse irradiation, since light is irradiated at the center of the pattern pit and weak light is irradiated until the spot reaches the next pit, heat generated at the pit diffuses thoroughly while the spot moves between pits. As a result, the probability that a plurality of pits is molten at the same time decreases, resulting in the error rate being decreased.

SECOND EMBODIMENT

Figure 11:
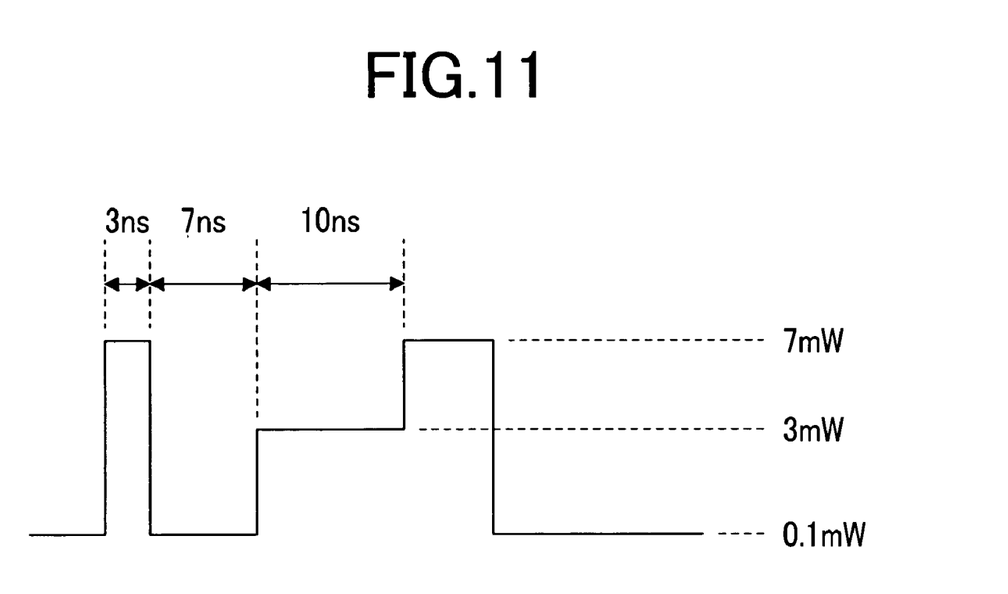
FIG. 11 is a drawing showing a recording waveform used in the second embodiment.

Here, a case where a chevron type pattern pit is formed is described. An amorphous mark was recorded by using the device shown in FIG. 6 on the phase change film of the optical disk having a structure shown in FIG. 5A, which is the same as the first embodiment. However, here, $Ge_5Sb_{70}Te_{25}$ was used for the phase change film, not $Ge_2Sb_2Te_5$. This phase change film makes it possible to form a chevron mark such as the one described in the Japanese Journal of Applied Physics, Vol. 41, pp. 631-635. The recording conditions were a disk line speed of 2 m/s, a track pitch of 240 nm, and the recording waveform was the one shown in FIG. 11. Accordingly, a chevron type amorphous mark with a mark length of 20 nm and a space length of 20 nm could be recorded.

A pattern pit was formed by peeling off and etching this optical disk as shown in FIGS. 5D and 5E. A mold of a pattern pit could be taken in the UV resin by applying this optical disk to a sample on which the UV resin was coated on the glass substrate. The stamper 404 of FIG. 4B was fabricated by plating Ni on this sample. An optical disk was fabricated by the method shown in FIG. 4 using this stamper. When the pattern of the stamper was transferred to the disk in FIG. 4B, a voltage pulse of 10 V and 10 ns was applied to the gap between them. The fabricated structure of the optical disk is one shown in FIG. 5F.

A mark was recorded on this optical disk under the same conditions of the first embodiment. Pulse light described in the first embodiment was irradiated while reproducing data and the pulse power was controlled to be 2.8 mW. The error rate of the reproducing signal was $1.4 \times 10^{-6}$. It is supposed that the reason why the error rate is low although the mark length is smaller than the first embodiment is that the pattern pit is a chevron type. Since the chevron mark has a wider width and the mark area is large even if the mark length is small, the reproducing signal amplitude does not become extremely small. This is an advantage of phase change recording. However, in the present invention, since a mark is recorded at the molten position of the chevron type pit, marks of Ag and Fe also become a chevron type. Therefore, the reproducing signal amplitude could be ensured.

As a result, an optical disk having a data capacity of about 250 GB could be recorded/reproduced with the data transfer speed of about 270 MHz.

THIRD EMBODIMENT

A case where Si and Cr are used for a recording film is described. A stamper was fabricated by a method shown in the second embodiment. A pattern of the stamper was transferred to the optical disk having the following structure formed by sputtering in the same manner as the second embodiment: 0.1 mm thick polycarbonate sheet/$SiO_2$ (50 nm)/$Cr_2O_3$ (5 nm)/$Ge_5Sb_{70}Te_{25}$ (5 nm). After transfer, etching was performed under the same conditions as the first embodiment to make it the state of FIG. 4D. Films as follows were deposited on this sample: $Cr_2O_3$ (5 nm)/$SiO_2$ (20 nm)/Si (10 nm)/Cr (10 nm)/$SiO_2$ (110 nm)/Ag (30 nm). A 1.1 mm thick polycarbonate substrate was affixed on the Ag film of this disk using a UV curable resin to fabricate an optical disk. The optical characteristics of this optical disk are shown in Table 2.

TABLE 2

|  | Region 1 | Region 2 | Region 3 | Region 4 | Region 5 |
| --- | --- | --- | --- | --- | --- |
| State of recording mark | Not exist | Not exist | Not exist | Exist | Exist |
| State of pattern pit | Not exist | Crystalline | Molten | Crystalline | Molten |
| Reflectivity | 6.3% | 6.1% | 15.3% | 6.0% | 5.8% |
| Absorbance of recording film | 34.3% | 48.1% | 53.1% | 60.3% | 71.4% |

A mark was recorded on this optical disk under the same conditions of the second embodiment. The disk line speed was controlled to be 5 m/s, the recording waveform shown in FIG. 7 was used, and the recording power was controlled to be 8 mW.

When the recorded data was reproduced by the pulse irradiation described in this first embodiment, the error rate was $7.8 \times 10^{-6}$.

FOURTH EMBODIMENT

The case where the present invention is applied to a rewritable optical disk is described. A sample in the state of FIG. 4D was fabricated in the same manner as the third embodiment. The structure of a sample to which the pattern was transferred is as follows: 0.1 mm thick polycarbonate sheet/$SiO_2$ (73 nm)/$Cr_2O_3$ (5 nm)/$Ge_5Sb_{70}Te_{25}$ (5 nm)

Films as follows were deposited on this sample: $Cr_2O_3$ (5 nm)/ZnS—$SiO_2$ (100 nm)/$Cr_2O_3$ (5 nm)/$Ge_2Sb_2Te_5$ (10 nm)/ZnS—$SiO_2$ (40 nm)/$SiO_2$ (10 nm)/Ag (200 nm). The optical characteristics of this optical disk are shown in Table 3.

TABLE 3

|  | Region 1 | Region 2 | Region 3 | Region 4 | Region 5 |
| --- | --- | --- | --- | --- | --- |
| State of recording mark | Not exist | Not exist | Not exist | Exist | Exist |
| State of pattern pit | Not exist | Crystalline | Molten | Crystalline | Molten |
| Reflectivity | 10.3% | 4.4% | 18.6% | 4.4% | 2.4% |
| Absorbance of recording film | 20.4% | 28.4% | 33.1% | 40.7% | 53.9% |

Figure 12:
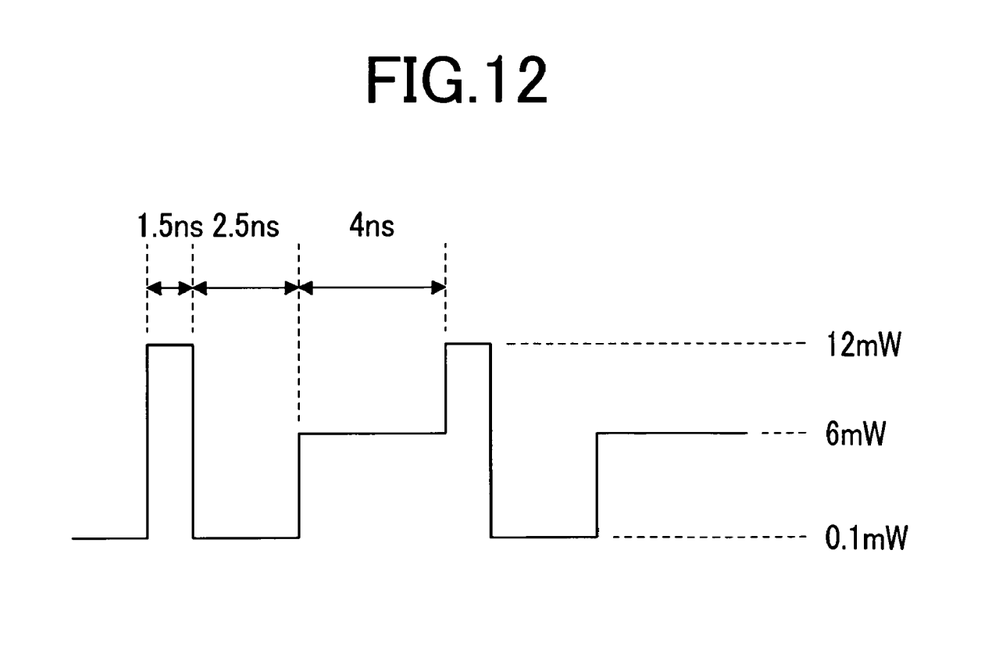
FIG. 12 is a drawing showing a recording waveform used in the fourth embodiment.

A phase change mark was recorded on the optical disk at a line speed of 5 m/s. Herein, the recording waveform shown in FIG. 12 was used. When pulse reproduction described in the first embodiment was performed at a line speed of 5 m/h and with a power of 1.9 mW while reproducing, the error rate was $5.4 \times 10^{-5}$.

FIFTH EMBODIMENT

The case where a double layer optical disk is fabricated by using a transparent oxide film for the recording film of the present invention is described.

Figure 4A:
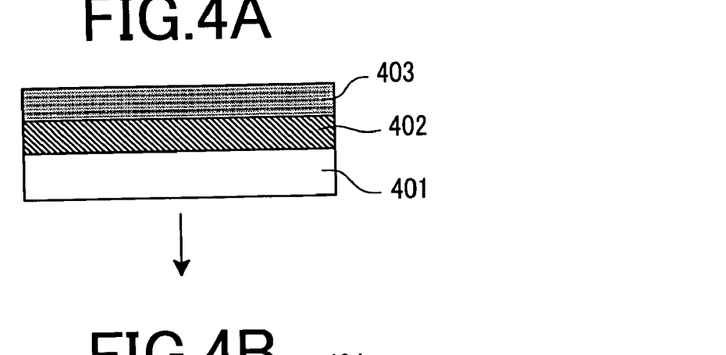
FIG. 4A is an explanatory drawing illustrating a pattern pit transcription method for manufacturing an optical disk of the present invention.
Figure 4B:
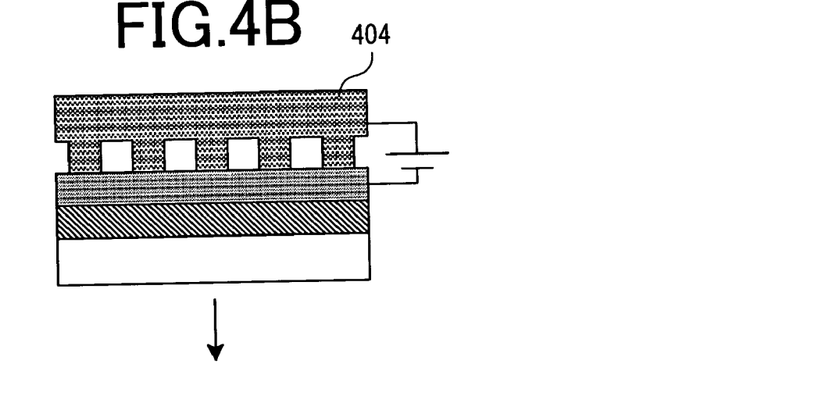
FIG. 4B is an explanatory drawing illustrating a pattern pit transcription method for manufacturing an optical disk of the present invention.
Figure 4C:
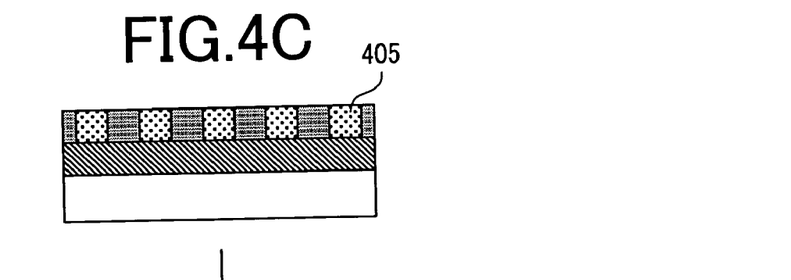
FIG. 4C is an explanatory drawing illustrating a pattern pit transcription method for manufacturing an optical disk of the present invention.
Figure 4D:
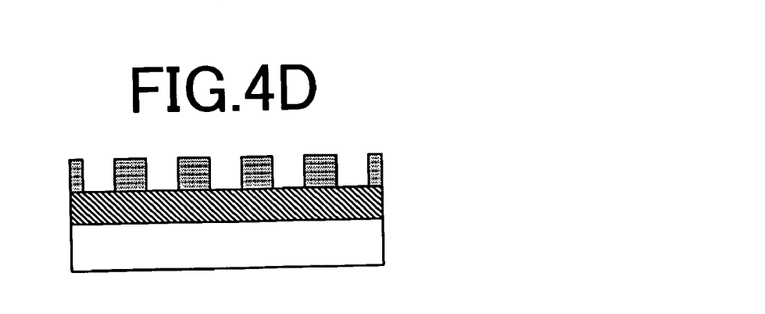
FIG. 4D is an explanatory drawing illustrating a pattern pit transcription method for manufacturing an optical disk of the present invention.

A sample like FIG. 4D was fabricated the same as the third embodiment. Herein, a pattern was transferred to samples having two different kinds of structures.

Structure 1: 0.1 mm thick polycarbonate/$SiO_2$ (40 nm)/$Cr_2O_3$ (5 nm)/$Ge_5Sb_{70}Te_{25}$ (5 nm)

Structure 2: 1.1 mm thick polycarbonate/Ag (100 nm)/$SiO_2$ (15 nm)/ZnS—$SiO_2$ (55 nm)/$Ge_5Sb_{70}Te_{25}$ (5 nm)

Etching was performed on the above-mentioned two samples to make them the state of FIG. 4D. Moreover, films having the structures shown as follows were deposited on the samples having the structure 1 and the structure 2 by sputtering to make structures 1' and 2', respectively.

Structure 1': $Cr_2O_3$ (5 nm)/$SiO_2$ (80 nm)/$Ag_2O$ (10 nm)/$SiO_2$ (40 nm)

Structure 2': $Cr_2O_3$ (5 nm)/$SiO_2$ (100 nm)/$Ag_2O$ (13 nm)/$SiO_2$ (70 nm)/Ag (100 nm)

A double layer optical disk was fabricated by stacking the structures 1' and 2' by a UV curable resin. The thickness of the UV curable resin was controlled to be 20 µm. Here, the structure 1' was adjusted to the light incidence side and the structure 2' adjusted to the interior side. Here, the structure 1' and the structure 2' are called the first layer and the second layer, respectively.

The optical characteristics of the first layer and second layer are shown in table 4. Here, the reflectance of the second layer shows the reflectance of the single layer optical disk having a structure of the second layer. Since $Ag_2O$ is transparent, the permeability of the non recording part of the first layer is high.

TABLE 4

|  |  | Region 1 | Region 2 | Region 3 | Region 4 | Region 5 |
|---|---|---|---|---|---|---|
| State of recording mark | | Not exist | Not exist | Not exist | Exist | Exist |
| State of pattern pit | | Not exist | Crystalline | Molten | Crystalline | Molten |
| First layer | Reflectivity | 2.3% | 12.6% | 3.1% | 11.4% | 10.9% |
| | Permeability | 92.1% | 60.2% | 70.7% | 50.8% | 53.5% |
| Second layer | Reflectivity | 6.5% | 32.1% | 10.9% | 32.9% | 30.4% |

The average permeability of the first layer is estimated. In the case when recording/reproducing is performed at the second layer, since the pattern pit of the first layer does not melt, it only has to obtain the average of the regions 1, 2, and 4. In a typical disk, the mark area is from ⅓ to ¼ of the disk area. Herein, if it is assumed that ⅓ of the disk area is the pattern pit and the ½ is the mark, the permeability of the first layer $T^1$ is written as follows using the permeability of the regions 1, 2, and 4, $T^1_1$, $T^1_2$, and $T^1_4$.

$$T^1 = \frac{2T^1_1 + \frac{T^1_2 + T^1_4}{2}}{3} \qquad \text{[Numerical expression 1]}$$

According to the above expression, $T^1$ is calculated to about 83.2%. A mark was recorded in this optical disk by the recording waveform of FIG. 11 at a line speed of 5 m/s. However, the recording power was 10 mW for recording the first layer and 15 mW for recording the second layer. The pulse was irradiated the same as the first embodiment while reproducing data. The injected pulse power was 2.8 mW for the first layer and 3.9 mW for the second layer. The error rates of the first layer and the second layer were $8.8 \times 10^{-5}$ and $5.9 \times 10^{-5}$, respectively.

What is claimed is:

1. An optical information recording medium which records and enables reproduction of information by irradiation of light, comprising:
    a substrate;
    a pit pattern film formed on said substrate in which a plurality of pits comprised of a phase change material, which melt by irradiation of a recording light and irradiation of a reproducing light, are aligned regularly; and
    a recording film formed on said pit pattern film;
    wherein a recording mark is formed in the recording film by irradiation of the recording light through a molten pit of the pit pattern film,
    wherein |R3–R5| which is a difference between a reflectance R3 of a region where said pit is molten and a recording mark is not being recorded on said recording film, and a reflectance R5 of a region where said pit is molten and a recording mark is being recorded on said recording film, is greater than |R2–R4| which is a difference between a reflectance R2 where said pit is not molten and a recording mark is not being recorded on said recording film, and a reflectance R4 where said pit is not molten and a recording mark is being recorded on said recording film.

2. An optical information recording medium according to claim 1, wherein said plurality of pits comprised of the phase change material are formed as a pattern having a single frequency along a track.

3. An optical information recording medium according to claim 1, wherein said plurality of pits comprised of the phase change material have almost the same size.

4. An optical information recording medium according to claim 1, wherein the phase change material in said pits includes at least one selected from a group of Ge, Sb, Te, Ag, and In.

5. An optical information recording medium according to claim 1, wherein an optical absorbance of said recording film in a region where said pit is molten is greater than the optical absorbance of said recording film in a region where said pit is not molten and the optical absorbance of said recording film in a region between pits, when a recording mark is not being recorded on said recording film.

6. An information recording method for recording information to an optical information recording medium having a pit pattern film including a plurality of pits comprised of a phase change material and aligned regularly, and a recording film formed on said pit pattern film, comprising:
    a process for positioning a light spot of a recording light to an information recording position of said information recording medium;
    a process for melting one pit of a plurality of pits of the pit pattern film which is irradiated by said light spot; and
    a process for changing the optical characteristics of said recording film by irradiating said recording light through a molten pit and forming a recording mark on said information recording position of said recording film corresponding to said molten pit,
    wherein |R3–R5| which is a difference between a reflectance R3 of a region where said pit is molten and a recording mark is not being recorded on said recording film, and a reflectance R5 of a region where said pit is molten and a recording mark is being recorded on said recording film, is greater than |R2–R4| which is a difference between a reflectance R2 where said pit is not molten and a recording mark is not being recorded on said recording film, and a reflectance R4 where said pit is not molten and a recording mark is being recorded on said recording film.

7. An information recording method according to claim 6, wherein an optical absorbance of said recording film in a region where said pit is molten is greater than the optical absorbance of said recording film in a region where said pit is not molten and the optical absorbance of said recording film in a region between pits when a recording mark is not being recorded on said recording film.

8. An information reproducing method for reproducing information recorded in an optical information medium having a pit pattern film including a plurality of pits comprised of a phase change material and aligned regularly, and a recording film formed on said pit pattern film, comprising:
    a process for positioning a light spot of reproducing light on said plurality of pits in order and melting one pit of a plurality of pits which are irradiated by said light spot through the pit pattern film; and
    a process for detecting a difference between the intensity of a portion of said reproducing light reflected from said one molten pit and a portion of said reproducing light reflected from pits which are not molten, wherein |R3−R5| which is a difference between a reflectance R3 of a region where said pit is molten and a recording mark is not being recorded on said recording film, and a reflectance R5 of a region where said pit is molten and a recording mark is being recorded on said recording film, is greater than |R2−R4| which is a difference between a reflectance R2 where said pit is not molten and a recording mark is not being recorded on said recording film, and a reflectance R4 where said pit is not molten and a recording mark is being recorded on said recording film.

9. An optical information recording medium according to claim 1, wherein said recording film is formed on said pit pattern film by a local absorption of a portion of said recording light.

10. A method for reproducing information as recorded data on a medium, the method comprising:

prov101ing the medium which has a super-resolution film and a recording mark formed in the super-resolution film;

reproducing information from the medium by irradiating a light beam on the medium;

wherein the medium does not have a super-resolution effect when the light beam with a first power level is irradiated on the medium, and the medium has a super-resolution effect when the light beam with a second power level higher than the first power level is irradiated on the medium, wherein a readout signal level to irradiate the light beam with the second power level on the recording mark is lower than a readout signal level to irradiate the light beam with the first power level on the recording mark, and wherein a readout signal level to irradiate the light beam with the second power level on an area other than the recording mark is higher than a readout signal level to irradiate the light beam with the first power level on the area other than the recording mark.

11. A method according to claim 10, wherein the medium which enables reproduction of information by irradiation of light, comprises:

a substrate;

the super-resolution film formed on the substrate in which a plurality of pits comprised of a phase change material, which melt by irradiation of the light beam, are aligned; and a recording film formed on the super-resolution film;

wherein the recording mark is formed in the recording film, via a molten pit of the super-resolution film.

12. A method according to claim 11, wherein said pits are formed as a pattern having a single frequency along a track on the medium.

13. A method according to claim 11, wherein said pits have almost the same size.

14. A method according to claim 11, wherein the phase change material in said pits includes at least one selected from a group of Ge, Sb, Te, Ag, and In.

* * * * *